United States Patent
Deliwala

(10) Patent No.: US 7,215,846 B1
(45) Date of Patent: May 8, 2007

(54) MODE DISCRIMINATING ON-CHIP OPTICAL COUPLER FOR AN OPTICAL RECEIVER CONNECTED TO DUAL MODE/MULTIMODE FIBER

(75) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 100 days.

(21) Appl. No.: 10/988,778

(22) Filed: Nov. 15, 2004

(51) Int. Cl.
*G02B 6/26* (2006.01)
*G02B 6/42* (2006.01)

(52) U.S. Cl. .......................... 385/28; 385/15; 385/27; 385/29; 385/31; 385/42; 385/43; 385/44; 385/45; 385/50

(58) Field of Classification Search ................ 385/28
See application file for complete search history.

(56) References Cited

U.S. PATENT DOCUMENTS 4,176,911 A * 12/1979 Marcatili et al. ........... 385/124
5,717,798 A *  2/1998 Strasser et al. ............... 385/37
6,819,849 B1* 11/2004 Tangonan et al. .......... 385/126

OTHER PUBLICATIONS

"Modal Noise in Multimode Fibers Under Restricted Launch Conditions," Papen et al., *J. of Lightwave Technology*, vol. 17, n. 5 (May 1999).
"Reduction of Modal Noise by Using Reduced Spot Excitation," Saijonmaa et al., *Applied Optics*, vol. 20, n. 24 (Dec. 15, 1981).
"An Experimental and Theoretical Study of the Offset Launch Technique for the Enhancement of the Bandwidth of Multimode Fiber Links," Raddatz et al., *J. of Lightwave Technology*, vol. 16, n. 3 (Mar. 1998).
"Enhanced Multimode Fiber Link Performance Using a Spatialy Resolved Receiver," Patel et al., *IEEE Photonics Technology Letters*, vol. 14, n. 3 (Mar. 2002).
"Exploiting Diversity in Multimode Fiber Communications Links Via Multisegment Detectors and Equalization," Argon et al., *IEEE Communications Letters*, vol. 7, n. 8 (Aug. 2003).
"Light Coupling by a Vortex Lens into Graded Index Fiber," Johnson et al., *J. of Lightwave Technology*, vol. 19, n. 5 (May 2001).
"Selective Excitation of Parabolic-Index Optical Fibers by Gaussian Beams," Saijonmaa et al., *Applied Optics*, vol. 19, n. 14 (Jul. 15, 1980).
"A Mode-Filtering Scheme for Improvement of the Bandwidth-Distance Product in Multimode Fiber Systems," Haas et al., *J. of Lightwave Technology*, vol. 11, n. 7 (Jul. 1997).
"Dispersive Multiplexing in Multimode Fiber," H.R. Stuart, *Th V2-1/305*.
"Differential Mode Loss and Mode Conversion in Passive Fiber Components Measured Using the Chromatic Launching and the Central Spot Far Field Techniques," Severin et al., *J. of Lightwave Technology* vol. LT-4, n. 11 (Nov. 1986).
"Statistical Analysis of Conditioned Launch for Gigabit Ethernet Links Using Multimode Fiber," Webster et al., *J. of Lightwave Technology*, vol. 17, n. 9 (Sep. 1999).

* cited by examiner

*Primary Examiner*—Frank G. Font
*Assistant Examiner*—Mary El-Shammaa
(74) *Attorney, Agent, or Firm*—Gauthier & Connors LLP

(57) ABSTRACT

A mode coupler structure includes a discriminating structure that discriminates between various incoming modes from an input optical fiber structure. A waveguide structure is coupled to the discriminating structure that couples light not discriminated by the discriminating structure to an output optical fiber structure.

8 Claims, 4 Drawing Sheets

MODE DISCRIMINATING ON-CHIP OPTICAL COUPLER FOR AN OPTICAL RECEIVER CONNECTED TO DUAL MODE/MULTIMODE FIBER

BACKGROUND OF THE INVENTION

The invention relates to the field of mode couplers used in receivers, and in particular to mode discriminating for an optical receiver connected to dual mode/multimode fibers.

Most fiber links greater than 200–300 m use lasers with the wavelengths greater than 1200 nm and specifically at the wavelengths around 1310 nm, 1490 nm, 1510–1570 nm, and 1620 nm. On the other hand, fiber links less than 200 m are dominated by a wavelength around 850 nm. The standard fiber for use in the 1200–1600 nm range have core diameter of approximately 8 µm and many of these fibers become dual mode for 850 nm transmission.

Use of standard fibers (i.e., those that are designed to be single mode in the 1200–1600 nm window) with 850 nm wavelength would result in excitation of both the modes (with variable amplitudes depending on the launch conditions as well as factors such as the imperfections and bends in the fiber). These modes travel at different speeds and thus high speed transmission becomes difficult due to overlap of data pulses after traveling some distance in the fiber.

At the other extreme, multimode fibers are used with a typical core diameter of 50/62.5 micron that support 100's of modes. Each of these modes travel at different speeds and the resulting modal dispersion limits the bandwidth-distance product. Recently, many have used restricted mode launch, e.g., launch laser beam in the center of the fiber that significantly underfills the multimode fiber core to increase the effective bandwidth-distance product due to excitation of fewer modes.

SUMMARY OF THE INVENTION

According to one aspect of the invention, there is provided a mode coupler structure. The mode coupler structure includes a discriminating structure that discriminates between various incoming modes from an input optical fiber structure. A waveguide structure is coupled to the discriminating structure that couples light not discriminated by the discriminating structure to an output optical fiber structure.

According to another aspect of the invention, there is provided a method of forming a mode coupler structure. The method includes forming a discriminating structure that discriminates between various incoming modes from an input optical fiber structure. Also, the method includes forming waveguide structure that is coupled to the discriminating structure that couples light not discriminated by the discriminating structure to an output optical fiber structure.

DETAILED DESCRIPTION OF THE INVENTION

The invention uses a mode coupler that resides on an integrated opto-electronic receiver circuit. This mode coupler includes specific properties such that it allows one to discriminate between various incoming modes. In case of a dual-mode fiber (i.e., use of 1200–1600 nm single mode fiber at 850 nm), one can design the mode coupler of the invention to only accept the fundamental mode while rejecting the higher order mode or vice versa. The fiber can now be used for longer distances, in fact 850 nm wavelength can be used to transmit data over a distance of many kilometers at 10 Gbps. The rejection of the other mode will manifest indirectly as increasing in the "link loss" for the accepted mode. For example, assuming equal excitation of both the modes, filtering of one of the modes would seem to increase the link loss by 3 dB.

Figure 1:
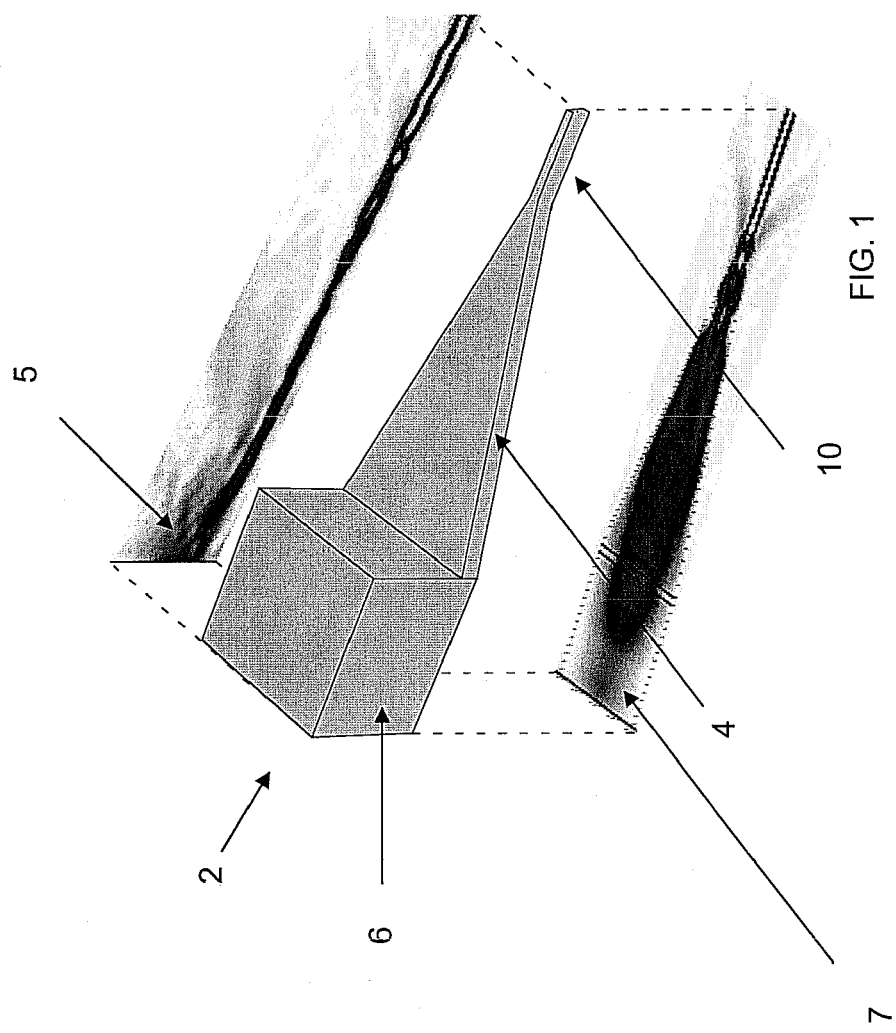
FIG. 1 is a schematic diagram of the mode coupler in accordance with the invention.

FIG. 1 shows an exemplary embodiment of an integrated mode coupler 2 of the invention includes a larger fiber mode to the smaller waveguide coupling region 6 called fiber coupler that may be vertically index gradient optimized for receiving input Gaussian-like beam from the fiber. The fiber coupler 6 will couple light to the thin waveguide 4 which is itself a two-dimensional adiabatic taper that couples incoming light from fiber coupler 6 into a single mode waveguide 10. The top projection 5 and bottom projection 7 in the FIG. 1 shows the evolution of the incoming Gaussian beam as it propagates in this structure. The fiber coupler 6 in this case includes a gradient index stack so as to couple efficiently to the adiabatic taper 4. In this case, the incoming beam is efficiently coupled into the single mode waveguide 10. The light in the waveguide 10 is then detected.

This particular geometry of FIG. 1 is also the mode filter. In this case, one can have high overlap with the fundamental mode of the input field. Higher order modes coming from the input field distributions will not propagate into the single mode waveguide 10. This is further illustrated in FIG. 3 in which one show separately the effect of propagation of higher order modes in this type of structure. One notices that only the fundamental Gaussian-like mode is coupled to the single mode waveguide 10 that will produce its focus at different locations when excited by a higher order mode, and thus will couple the light to a waveguide 4 at the base. Note in other embodiments of the invention, the waveguide 4 can be coupled to the top of the taper 6.

Figure 2:
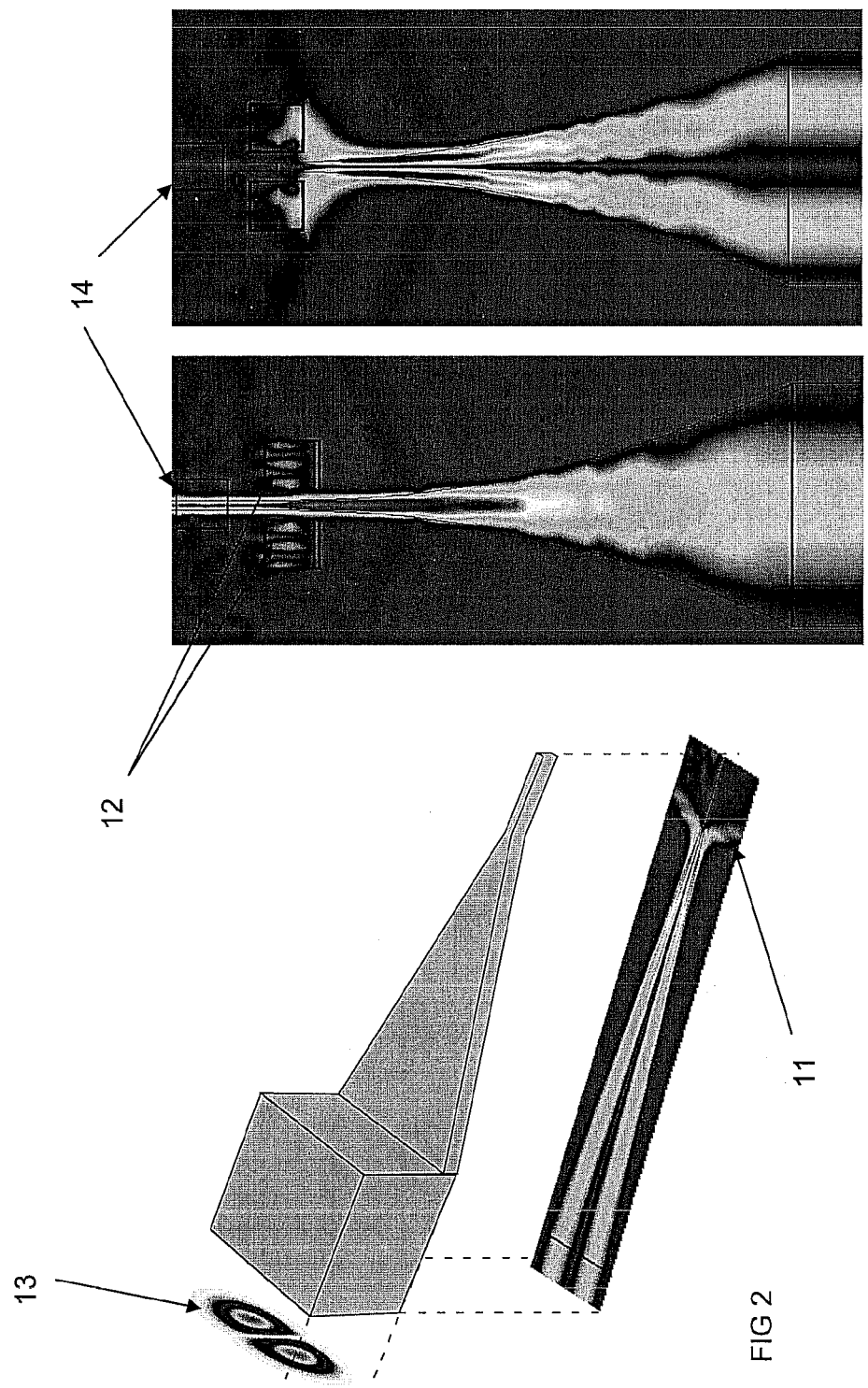
FIG. 2 is a schematic diagram of a second embodiment of the inventive mode coupler.

Now suppose that the incoming light primarily consisted of next higher mode as shown in FIG. 2. One can notice that the propagation through the adiabatic taper 11 leads to complete loss of this higher order mode 13 to radiation and very little light is coupler to the SM waveguide 10 and thus to the detector 14 at the other end of the waveguide 10. On the other hand, one can place two detectors 12 in the path of the radiated field (or use a waveguide to collect that light to which leads to these detectors). These detectors 12 will primarily detect a particular higher mode depending on their placement. As FIG. 2 shows, detectors 12 weakly detect fundamental mode but strongly detect their designated mode. Thus one can built an integrated mode filter and detector system that allows multiple modes from the input stream to be separated.

Figure 3:
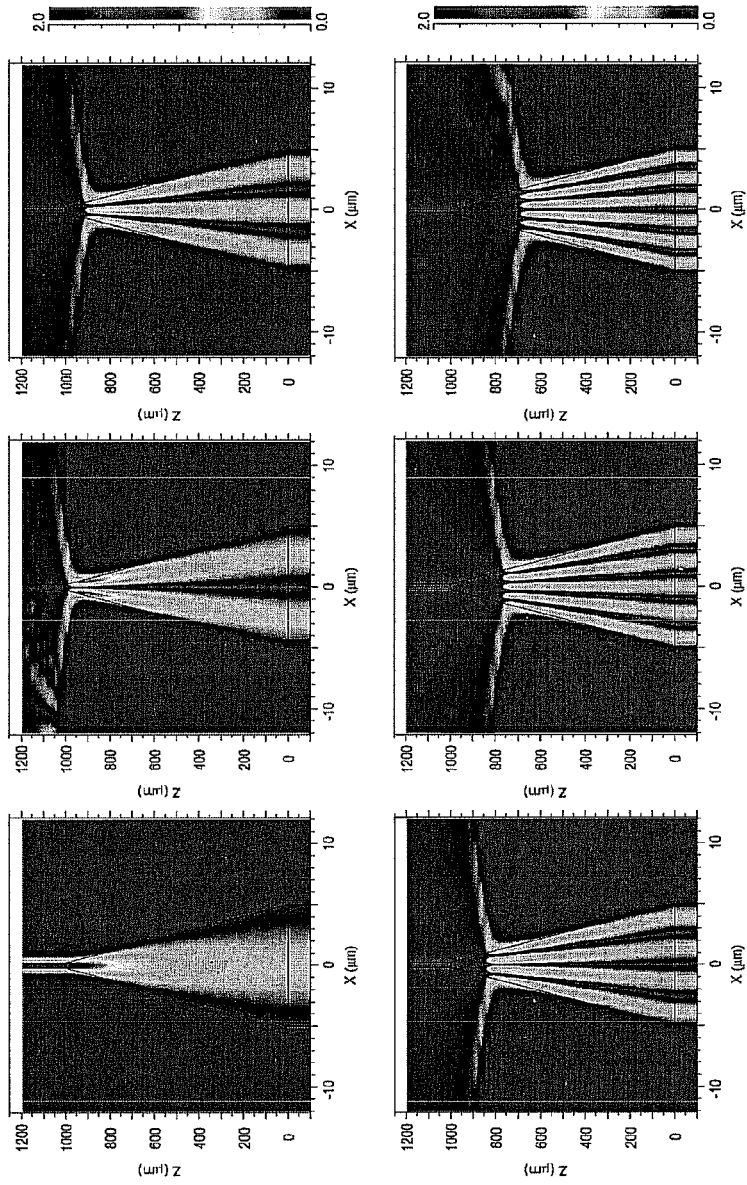
FIG. 3 is graph demonstrating the various modes that leak out of an adiabatic taper.

FIG. 3 shows radiation patterns for many higher order modes which suggests that each incoming mode group can be assigned detectors (as in FIG. 2) in order to predominantly detect these modes.

In general, each detector will see a small amount of other modes but these ratios can be known either simulation or by measurement. Thus, signal processing circuit which receives data from all of these detectors can perform linear transformation on the input signals to improve mode-based channel separation. A signal processing element may also include electrical or optical tunable delay stages in order to align various modal delays in the channel.

Figure 4:
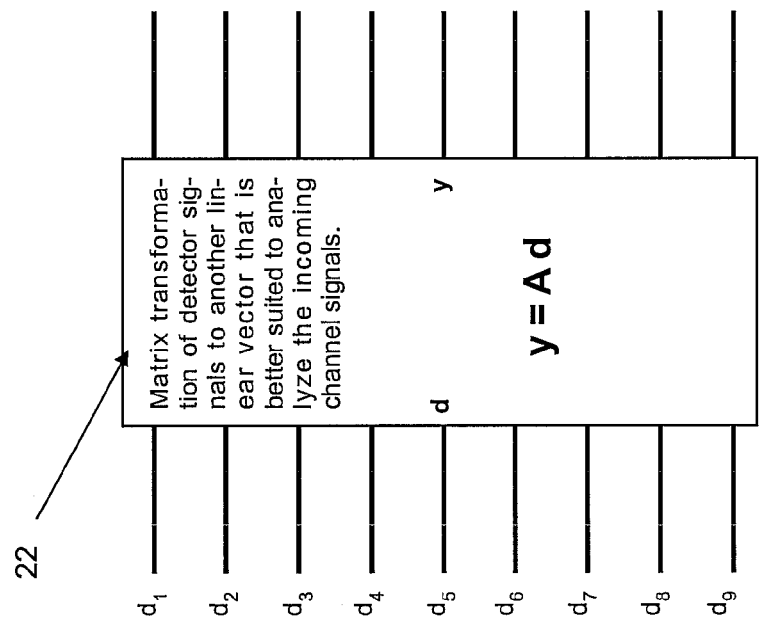
FIG. 4 is a schematic diagram of using multiple modes for communicating multiple signals.
Figure 4:
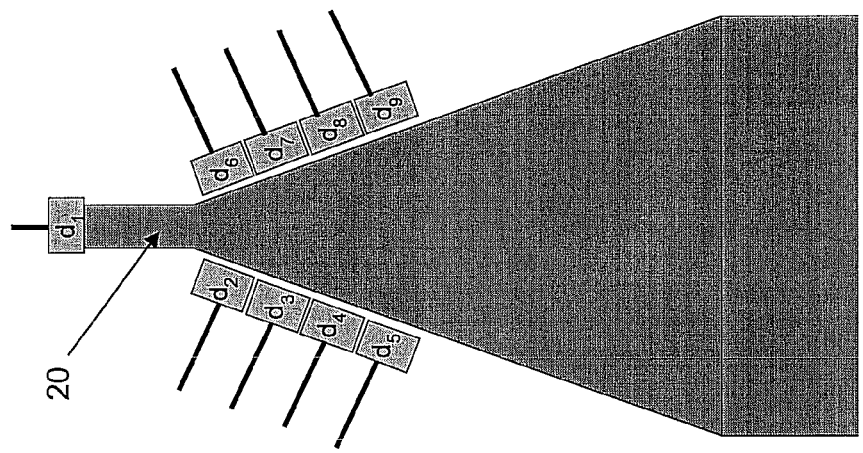

Multiple detectors with spatial pattern sampling are shown in FIG. 4. Consider now a specific case of transmission of single channel that arrives at the receiver 20 as admixture of multiple modes with each mode having slightly different arrival times. One can compute the detector excitations for the admixture of modes and in general transform the electrical signals by signal processing so that one can separate individual modal groups of the MM link. One can now produce a higher quality output by combining each of the outputs (corresponding to the energy in each of the modes of the MM link) in more intelligent way. This can be accomplished by summing after appropriate delays $\tau_k$. If the signals in each of the channels are represented as $d_1 \ldots d_k$, then one needs to find the sum $I=\Sigma d_k(t-\tau_k)w_k$, where one has to weight each individual diode with amplitudes and delay before summing. Note that the channels $d_1 \ldots d_k$ need not be the direct outputs of the detectors but represent the output after matrix transformation 22 (y=Ad) of signals from the detectors in order to correct for "cross-talk" by in their selectivity to individual modes.

Although the present invention has been shown and described with respect to several preferred embodiments thereof, various changes, omissions and additions to the form and detail thereof, may be made therein, without departing from the spirit and scope of the invention.

What is claimed is:

1. A mode coupler structure comprising:
   a discriminating structure that discriminates between various incoming modes from an input optical fiber structure, said discriminating structure includes vertically index gradient taper optimized for receiving input Gaussian-like beam from the fiber; and
   a waveguide structure that is coupled to said discriminating structure that couples light not discriminated by said discriminating structure to an output optical fiber structure, said waveguide structure includes an adiabatic taper so as to couple efficiently to the vertically index gradient taper.

2. The mode coupler of claim 1, wherein said adiabatic taper comprises a plurality of auxiliary waveguides and is coupled to at least two separated detectors attached to these waveguides.

3. The mode coupler of claim 1, wherein said waveguide is coupled at the base of said vertical index gradient taper.

4. The mode coupler of claim 3, wherein said waveguide is coupled at the top portion of said vertical index gradient taper.

5. A method of forming a mode coupler structure comprising:
   forming a discriminating structure that discriminates between various incoming modes from an input optical fiber structure, said discriminating structure includes vertically index gradient taper optimized for receiving input Gaussian-like beam from the fiber; and
   forming a waveguide structure that is coupled to said discriminating structure that couples light not discriminated by said discriminating structure to an output optical fiber structure, said waveguide structure includes an adiabatic taper so as to couple efficiently to the vertically index gradient taper.

6. The method of claim 5, wherein said adiabatic taper comprises a plurality of auxiliary waveguides and is coupled to at least two separated detectors attached to these waveguides.

7. The method of claim 5, wherein said waveguide is coupled at the base of said vertical index gradient taper.

8. The method of claim 7, wherein said waveguide is coupled at the top portion of said vertical index gradient taper.

* * * * *